(12) United States Patent
Ishida

(10) Patent No.: US 12,442,411 B2
(45) Date of Patent: Oct. 14, 2025

(54) SEALING DEVICE

(71) Applicant: UCHIYAMA MANUFACTURING CORP., Okayama (JP)

(72) Inventor: Koki Ishida, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 118 days.

(21) Appl. No.: 18/482,151

(22) Filed: Oct. 6, 2023

(65) Prior Publication Data

US 2024/0117842 A1 Apr. 11, 2024

(30) Foreign Application Priority Data

Oct. 7, 2022 (JP) ................... 2022-162785

(51) Int. Cl.
| | | |
|---|---|---|
| F16C 19/18 | (2006.01) | |
| B60B 27/00 | (2006.01) | |
| F16C 33/78 | (2006.01) | |
| F16C 33/80 | (2006.01) | |

(52) U.S. Cl.
CPC ........ *F16C 19/186* (2013.01); *F16C 33/7816* (2013.01); *F16C 33/783* (2013.01); *F16C 33/7886* (2013.01); *F16C 33/805* (2013.01); *B60B 27/0073* (2013.01); *F16C 2326/02* (2013.01)

(58) Field of Classification Search
CPC .. F16C 19/186; F16C 33/7816; F16C 33/783; F16C 33/7886; F16C 33/80; F16C 33/805; B60B 27/0073
See application file for complete search history.

(56) References Cited

U.S. PATENT DOCUMENTS

| | | | | |
|---|---|---|---|---|
| 7,708,467 | B2 * | 5/2010 | Suzuki | F16C 33/7826 |
| | | | | 384/607 |
| 11,828,332 | B2 * | 11/2023 | Lee | F16C 19/186 |
| 2008/0199120 | A1 | 8/2008 | Torii et al. | |
| 2010/0109424 | A1 | 5/2010 | Inoue et al. | |

FOREIGN PATENT DOCUMENTS

| | | |
|---|---|---|
| JP | S61134404 A | 8/1986 |
| JP | 4812263 B2 | 11/2011 |
| JP | 2012071654 A | 4/2012 |
| JP | 2012082912 A | 4/2012 |
| JP | 5422868 B2 | 2/2014 |

* cited by examiner

*Primary Examiner* — James Pilkington
(74) *Attorney, Agent, or Firm* — Muncy, Geissler, Olds & Lowe, P.C.

(57) ABSTRACT

A sealing device to be provided in a bearing device for sealing an annular gap between an outer member and a flange. The sealing device includes a slinger attached to the flange by bolts press-fitted into a plurality of bolt holes provided at the flange. The slinger includes a main body portion in a hollow disk shape having insertion portions into which the bolts are inserted, an elastic seal being made of an elastic member and being integrally formed around the insertion portions of the main body portion, and a slinger cylindrical portion extending from an inner diametrical side end portion of the main body portion into axial direction and forming a first labyrinth by a gap between the slinger cylindrical portion and an outer circumferential face of the outer member.

3 Claims, 7 Drawing Sheets

SEALING DEVICE

BACKGROUND OF THE INVENTION

Field of the Invention

The disclosure relates to a sealing device to be applied to a bearing device which has an outer member and an inner member which rotate relatively and coaxially. Specifically, the disclosure relates to the sealing device which seals an annular gap between a flange provided with the inner member in a cylindrical shape and the outer member.

Description of the Related Art

Conventionally, in a bearing device having an outer member and an inner member which rotate relatively and coaxially, a sealing device which seals an annular gap between the outer member and the inner member is widely used in the art. For instance, various structures are proposed as the sealing device which is applied to a space to be sealed between the outer member and the flange which is provided for the inner member in a cylindrical shape, (e.g., refer to Patent Documents 1 to 5).

For instance, Patent Documents 1 to 4 disclose the sealing device in which a slinger having a through hole which is aligned to a cylindrical portion of the inner member at a center part of the slinger is fixed onto an inner side of the flange, i.e., a side of the cylindrical portion of the inner member. Further, Patent Document 1 discloses a structure in which a lip facing an outer circumferential face of the outer member is arranged at a tip of the slinger. Patent Document 2 discloses a structure in which a seal member having a lip is arranged on the outer circumferential face of an outer member which faces the tip of a slinger. Patent Document 3 discloses a structure in which a seal member having a lip is arranged on the inner circumferential face of an outer member. Patent Document 4 discloses a sealing device in which, in addition to the seal member as disclosed in Patent Document 3, an annular dust cover which is press-fitted to an outer diameter of a flange is arranged. The dust cover has an overhang portion extending into the axial direction, and the tip of the overhang portion is arranged opposite to a side face of a knuckle attached to an outer member through a slight gap, thereby constituting a labyrinth seal. Patent Document 5 discloses a structure in which an O-ring is interposed between a flange and a slinger.

RELATED ART DOCUMENTS

Patent Documents

Patent Documents 1: Japanese Unexamined Utility Model Application Publication No. S61-134404
Patent Documents 2: Japanese Unexamined Patent Application Publication No. 2012-082912
Patent Documents 3: Japanese Patent No. 4812263
Patent Documents 4: Japanese Unexamined Patent Application Publication No. 2012-071654
Patent Documents 5: Japanese Patent No. 5422868

SUMMARY OF THE INVENTION

Problems to be Solved by the Intention

However, in the structure disclosed in the above-mentioned Patent Documents 1 to 3, the lip of the seal member is arranged only in the vicinity of an object to be sealed, so that it is undesirable that foreign substances or the like easily reach and stay around the lip. In the Patent Document 4, when the labyrinth seal functions normally, intrusion of foreign substances or the like is suppressed; however, in the structure in which the dust cover is press-fitted to the outer diameter of the flange, the dust cover easily moves if deformation or the like occurs in the inner member. If the labyrinth seal which is formed only by a tip portion of the dust cover does not function due to such movement, foreign substances or the like easily reach around the lip. On the other hand, in the Patent Document 5, intrusion of muddy water is prevented by arranging the O-ring between the flange and the slinger. However, assembling becomes complicated since work for attaching the O-ring is required. Thus, the above-mentioned conventional sealing device was not sufficiently satisfactory.

The disclosure is proposed in view of the above-mentioned problems. An object of the disclosure is to provide the sealing device which is assembled with comparative ease and prevents intrusion of foreign substances or the like into the object to be sealed more securely.

Means of Solving the Problems

To achieve the above-mentioned object, the present invention adopts a technical means to be mentioned below. In the present invention, a sealing device is provided in a bearing device having an inner member and an outer member that rotate relatively and coaxially, the sealing device sealing an annular gap between the outer member and a flange provided at the inner member in a cylindrical shape and extending in outer diametrical direction. The sealing device of one embodiment of the present invention has a slinger to be attached to the flange by bolts that are press-fitted into a plurality of bolt holes provided in the flange. Further, the slinger has a main body portion in a hollow disk shape, an elastic seal, and a slinger cylindrical portion. The main body portion has insertion portions into which the bolts are inserted. The elastic seal is made of an elastic member and is integrally formed around the insertion portions of the main body portion. The slinger cylindrical portion extends from an inner diametrical side end portion of the main body portion into axial direction and forms a first labyrinth by a gap between the slinger cylindrical portion and an outer circumferential face of the outer member.

In the present structure, by only attaching the slinger to the flange, sealing between the slinger and the flange by the elastic seal, and sealing of an annular gap between the flange and the outer member by the slinger cylindrical portion are achieved. Moreover, since the slinger is fixed to the flange by press-fitting the bolt, movement of the slinger is able to be prevented. Therefore, function of the first labyrinth does not deteriorate due to the movement of the slinger.

In the above-mentioned configuration, a structure in which the slinger is arranged to be adjacently opposed to a knuckle which is integrally provided on an outer circumferential side of the outer member so as to be spaced apart from the flange and further includes a circular plate portion which forms a second labyrinth by the gap between the circular plate portion and the knuckle is adopted.

In the present structure, the slinger cylindrical portion is arranged from the annular gap between the flange and the outer member throughout the knuckle arranged at the outer member so as to be spaced apart from the flange. By just attaching the slinger to the flange, the first labyrinth is constituted by the gap between the slinger cylindrical portion and the outer member; at the same time, the second labyrinth is constituted by the gap between the circular plate portion of the slinger and the knuckle. Accordingly, by a function of the second labyrinth in addition to a function of the first labyrinth, intrusion of foreign substances or the like into the vicinity of the annular gap between the flange and the outer member is prevented more securely.

In the above-mentioned structure, the slinger further includes an extension portion which forms a third labyrinth by a gap between the extension portion and an outer circumferential face of the knuckle.

In the present structure, by just attaching the slinger to the flange, a third labyrinth is constituted by the gap between the extension portion provided on a tip side of the slinger cylindrical portion and the outer circumferential face of the knuckle. Accordingly, by a function of the third labyrinth in addition to the functions of the first labyrinth and the second labyrinth, intrusion of foreign substances or the like into the vicinity of the annular gap between the flange and the outer member is more securely prevented.

In the above-mentioned structure, a seal member which is attached to the outer member is attached to the outer member. In the present case, the seal member includes a support member which is fitted to the outer member and a seal lip made of an elastic member, the seal lip being fixed to the support member, being elastically contacted to the flange or being arranged close to the flange.

In the present structure, the seal lip is arranged in the annular gap between the flange and the outer member, intrusion of foreign substances or the like into the annular gap is prevented more securely. Further, since intrusion of foreign substances or the like into the vicinity of the annular gap is prevented by the first labyrinth, the second labyrinth, or the third labyrinth, an effect which prevents intrusion of foreign substances or the like is sufficiently obtained even when the number of the seal lips is reduced or the seal lip is arranged without contacting the flange. That is, the seal lip is provided without increasing torque which is necessary for rotation of the inner member or the outer member.

In the above-mentioned structure, the seal member is fitted to the outer circumferential face of the outer member. The slinger cylindrical portion includes a first cylindrical portion which faces an outer circumferential face of the seal member fitted to the outer circumferential face of the outer member, and a second cylindrical portion which faces the outer circumferential face of the outer member and has a diameter which is smaller than that of the first cylindrical portion. The first cylindrical portion and the second cylindrical portion form a labyrinth which is bent along the outer circumferential face of the outer member to which the seal member is attached.

In the present structure, intrusion of foreign substances or the like into the vicinity of the annular gap between the flange and the outer member is prevented further securely by the bent labyrinth which is constituted by the first cylindrical portion and the second cylindrical portion of the slinger.

Effects of the Invention

According to the present invention, the sealing device which is able to be assembled with comparative ease and is able to prevent intrusion of foreign substances or the like into an object to be sealed more securely is able to be achieved.

DESCRIPTION OF THE EMBODIMENTS

An embodiment of the present invention is explained below based on the drawings. Part of detailed reference signs allotted to other figures are omitted in some figures. A sealing device according to the embodiment of the present invention is applied to a bearing device which includes an inner member and an outer member which rotate relatively and coaxially. The inner member in a cylindrical shape has a flange which continuously expands the diameter thereof. The outer member is provided outward in the diametrical direction relative to the inner member. The sealing device according to the embodiment of the present invention seals an annular gap between the outer member and the inner member.

Figure 1:
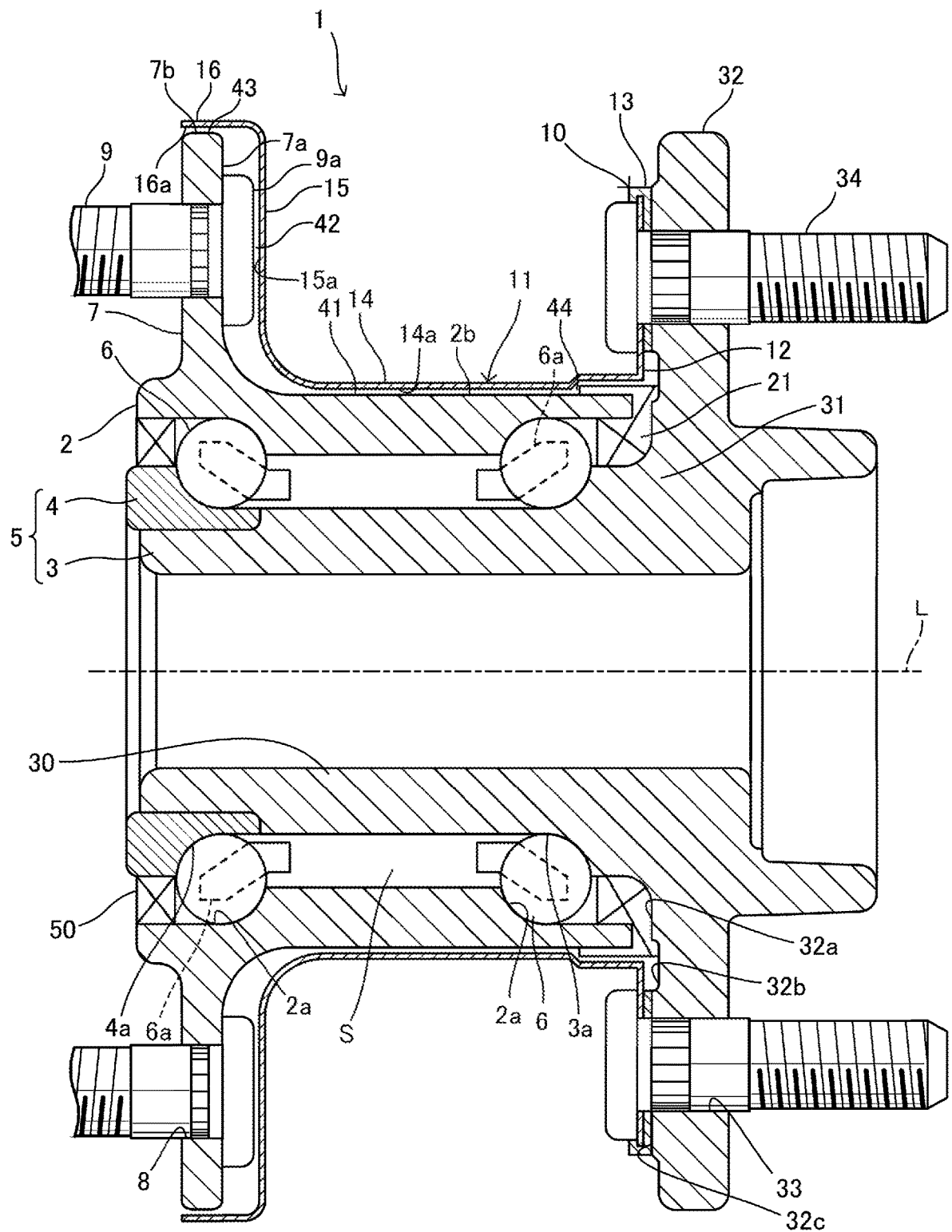
FIG. 1 is a longitudinal cross-sectional view schematically illustrating one example of the bearing device to which the sealing device of one embodiment of the present invention is applied.

FIG. 1 is a longitudinal cross-sectional view schematically illustrating one example of a bearing device 1 to which a sealing device 10 of one embodiment of the present invention is applied. The bearing device 1 illustrated in FIG. 1 is a hub bearing which rotatably supports a drive wheel of a motor vehicle. Herein, a side towards a wheel along a shaft L direction of the bearing device 1, i.e., the right side of FIG. 1, is referred to as a wheel side, and a side towards a vehicle body, i.e., the left side of FIG. 1, is referred to as a vehicle body side.

The bearing device 1 includes an outer ring 2, a hub wheel 3, an inner ring member 4 which is integrally fitted to a vehicle body side of the hub wheel 3, and two rows of rolling elements 6, 6 (balls) which are interposed between the outer ring 2 and the hub wheel 3, and between the outer ring 2 and the inner ring member 4. In the above-mentioned example, the outer ring 2 is the outer member, an inner ring 5 constituted by the hub wheel 3 and the inner ring member 4 is the inner member. The outer ring 2 is fixed to a vehicle body of the motor vehicle by a knuckle 7 which is integrally provided on a vehicle body side of the outer ring 2. The knuckle 7 is formed at a plurality of positions, for example, at four positions, in a circumferential direction of the outer ring 2 by a projection portion which continuously expands a diameter thereof outward in a diametrical direction of the outer ring 2. The knuckle 7 is integrally provided for the outer ring 2.

A drive shaft, not illustrated, is coaxially spline-fitted to the hub wheel 3. The inner ring 5, i.e., the hub wheel 3 and the inner ring member 4, is rotatably supported around a shaft L relative to the outer ring 2. The outer ring 2 and the inner ring 5 are constituted as two members which rotate relatively and coaxially; a bearing space S is formed as the annular gap between the two members. In the bearing space S, a bearing wheel 2a of the outer ring 2, a bearing wheel 3a of the hub wheel 3, and a bearing wheel 4a of the inner ring member 4 are interposed in a rotatable manner in a state in which the two rows of rolling elements 6, 6 are retained by a retainer 6a. The bearing space S is filled with lubricant such as grease for lubricating rolling motion of rolling elements 6, 6.

The hub wheel 3 has a hub wheel body 30 in a cylindrical shape, and a flange 32, i.e., a hub flange, which is formed so as to continuously expand the diameter thereof outward in the diametrical direction from the hub wheel body 30 through a rising base portion 31; the wheel is attached and fixed to the flange 32 by a bolt 34 and a nut, not illustrated. The flange 32 has a rising portion 32a which continues to the rising base portion 31, and a step portion 32b which is continuously formed in a stepped shape from an outer diametrical side of the rising portion 32a so as to separate into the wheel side along the shaft L. A projection portion 32c which is formed in a stepped shape continuing from the step portion 32b so as to project into the vehicle body side along the shaft L is formed around a bolt hole 33 which is provided at a plurality of positions in the circumferential direction of the flange 32. The projection portion 32c is annularly provided over an entire periphery of the flange 32. Although not especially limited, in the present embodiment, the surface of the step portion 32b is constituted by a casting surface; the surface of the rising portion 32a and the surface of the projection portion 32c are each constituted by a ground surface.

The sealing device 10 of the embodiment seals an end portion on a side of the flange 32 of the bearing space S, i.e., an annular gap between the flange 32 and the outer ring 2. That is, the sealing device 10 is mounted on a side of the flange 32 of the bearing device 1. Further, another optional sealing device 50 seals an end portion on an opposite side to the flange 32 side of the bearing space S. Thus, the sealing devices 10, 50 on both sides in the shaft L direction seal both end portions in the shaft L direction of the bearing space S, thereby suppressing intrusion of muddy water, foreign substances or the like into the bearing space S or leakage of lubricant filled in the bearing space S to the outside.

Figure 2:
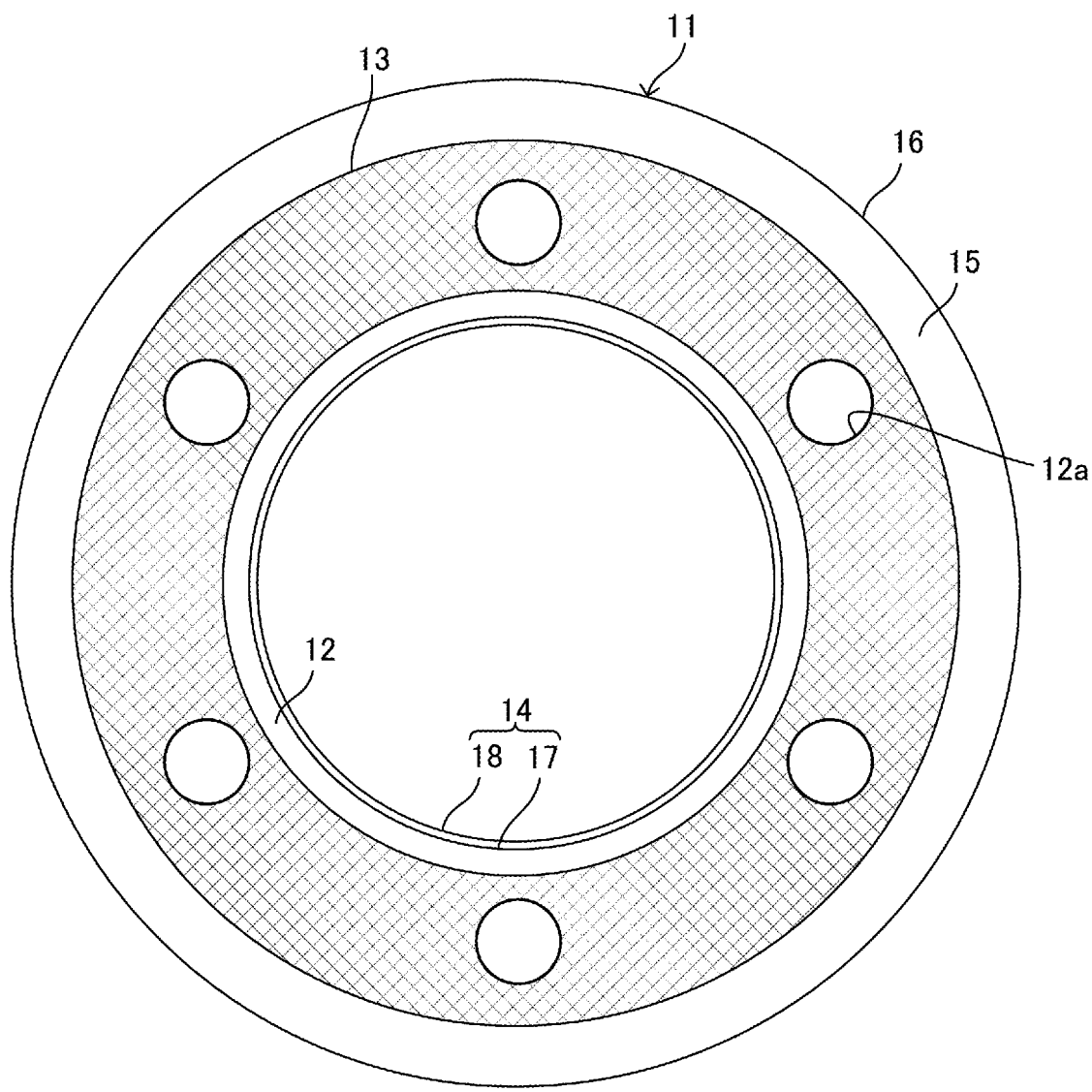
FIG. 2 is a side view schematically illustrating a state in which the main body portion and the slinger cylindrical portion of the sealing device of one embodiment of the present invention are seen from a flange side.

FIG. 2 is a side view schematically illustrating a state in which a slinger 11 constituting the sealing device 10 according to one embodiment of the present invention is seen from the flange side. As illustrated in FIG. 1 and FIG. 2, the sealing device 10 includes the slinger 11 and a seal member 21. The slinger 11 is attached to the flange 32 by the bolt 34 which is press-fitted into the bolt hole 33 of the flange 32. The seal member 21 is attached to an end portion of the outer ring 2 on the flange 32 side.

The slinger 11 includes a main body portion 12 in a hollow disk shape, an elastic seal 13 in an annular shape, a slinger cylindrical portion 14 in a cylindrical shape, a circular plate portion 15 in a hollow disk shape, and an extension portion 16 in a cylindrical shape. The main body portion 12, the elastic seal 13, the slinger cylindrical portion 14, the circular plate portion 15, and the extension portion 16 are arranged concentrically. In the sealing device 10 of the embodiment, four positions of labyrinths 41, 42, 43, 44, i.e., non-contact seal portions, which constitute a labyrinth seal between the slinger 11 and the outer ring 2 are formed by attaching the main body portion 12 of the slinger 11 to the flange 32.

The main body portion 12 has a plurality of insertion holes 12a, i.e., insertion portions, which penetrate in a thickness direction of the main body portion 12 and into which the bolts 34 are inserted. The slinger 11 is constituted by metallic material such as a stainless-steel plate, a cold-rolled steel plate, i.e., SPCC, or the like and is produced by sheet-metal processing. Further, the slinger 11 can be constituted by other kinds of metal such as aluminum, plastic resin, or the like.

The main body portion 12 is attached to a face on a vehicle body side of the flange 32 of the inner ring 5. The insertion holes 12a in the main body portion 12 are provided so as to respectively correspond to a plurality of bolt holes 33 in the flange 32. Although not especially limited, an outer diameter of the main body portion 12 is smaller than that of the flange 32, and a head portion of the bolt 34 which is press-fitted into the bolt hole 33 is set in a state so as to entirely overlap with the main body portion 12.

The elastic seal 13 is made of an elastic member and is integrally formed around the insertion holes 12a in the main body portion 12 on an opposite side to the flange 32. As illustrated in FIG. 2, the elastic seal 13 is annularly provided over the whole circumference of the main body portion 12 in a range of a specific width in the diametrical direction from an outer diametrical side end portion of the main body portion 12; all the insertion holes 12a are included within a range of the elastic seal 13, in other words, the insertion holes 12a are surrounded by the elastic seal. In the embodiment, the elastic seal 13 is composed of rubber and is integrally formed with the slinger 11 by vulcanized adhesion. When the main body portion 12 is attached to the flange 32, the elastic seal 13 becomes pressure-welded to the surface of the annular projection portion 32c of the flange 32. Thereby, a gap between the slinger 11 and the flange 32 is sealed. Further, since such a structure in which the slinger 11 is fixed to the flange 32 by press-fitting the bolt 34 is adopted as mentioned above, sealing of the gap between the slinger 11 and the flange 32 is not broken by the movement of the slinger 11. Furthermore, the surface of the projection portion 32c is made to be the ground surface.

The slinger cylindrical portion 14 is a member in the cylindrical shape which extends from an inner diametrical side end portion of the main body portion 12 along the shaft L into the direction of the vehicle body side. An inner diameter of the slinger cylindrical portion 14 is slightly greater than an outer diameter of the outer ring 2, and a first labyrinth 41 is formed by a gap between an inner circumferential face 14a of the slinger cylindrical portion 14 and an outer circumferential face 2b of the outer ring 2.

Further, the circular plate portion 15 is constituted by a member in a circular plate shape which is provided so as to rise outward in the diametrical direction from an end portion on an opposite side to the main body portion 12 of the slinger cylindrical portion 14. Although not especially limited, in the embodiment, a connection portion between the circular plate portion 15 and the slinger cylindrical portion 14 is constituted by a curved face as illustrated in FIG. 1.

A space between the main body portion 12 and the circular plate portion 15 is smaller than that between the flange 32 and the knuckle 7; when installing the slinger 11, the circular plate portion 15 becomes arranged so as to be opposed to the knuckle 7 adjacently. Although not especially limited, since the embodiment has a structure in which a bolt 9 is inserted from the wheel side into a bolt hole 8 which is provided in the knuckle 7, the circular plate portion 15 is arranged to be adjacently opposed to a bolt head of the bolt 9. A second labyrinth 42 is formed by a gap between a wheel side face 7a of the knuckle 7 and a vehicle body side face 15a of the circular plate portion 15 and by a gap between a wheel side face 9a of the bolt head of the bolt 9 and the vehicle body side face 15a of the circular plate portion 15.

The extension portion 16 is a member in the cylindrical shape which extends from an outer diametrical side end portion of the circular plate portion 15 along the shaft L into the direction of the vehicle body side. An inner diameter of the extension portion 16 is slightly greater than an outer diameter of the knuckle 7, and a third labyrinth 43 is formed by a gap between an inner circumferential face 16a of the extension portion 16 and an outer circumferential face 7b of the knuckle 7.

As mentioned above, the knuckle 7 is not provided over an entire periphery of the outer ring 2 but is provided at the plurality of positions in the circumferential direction of the outer ring 2. Consequently, the second labyrinth 42 and the third labyrinth 43 are formed only at a part in which the knuckle 7 exists.

Figure 3:
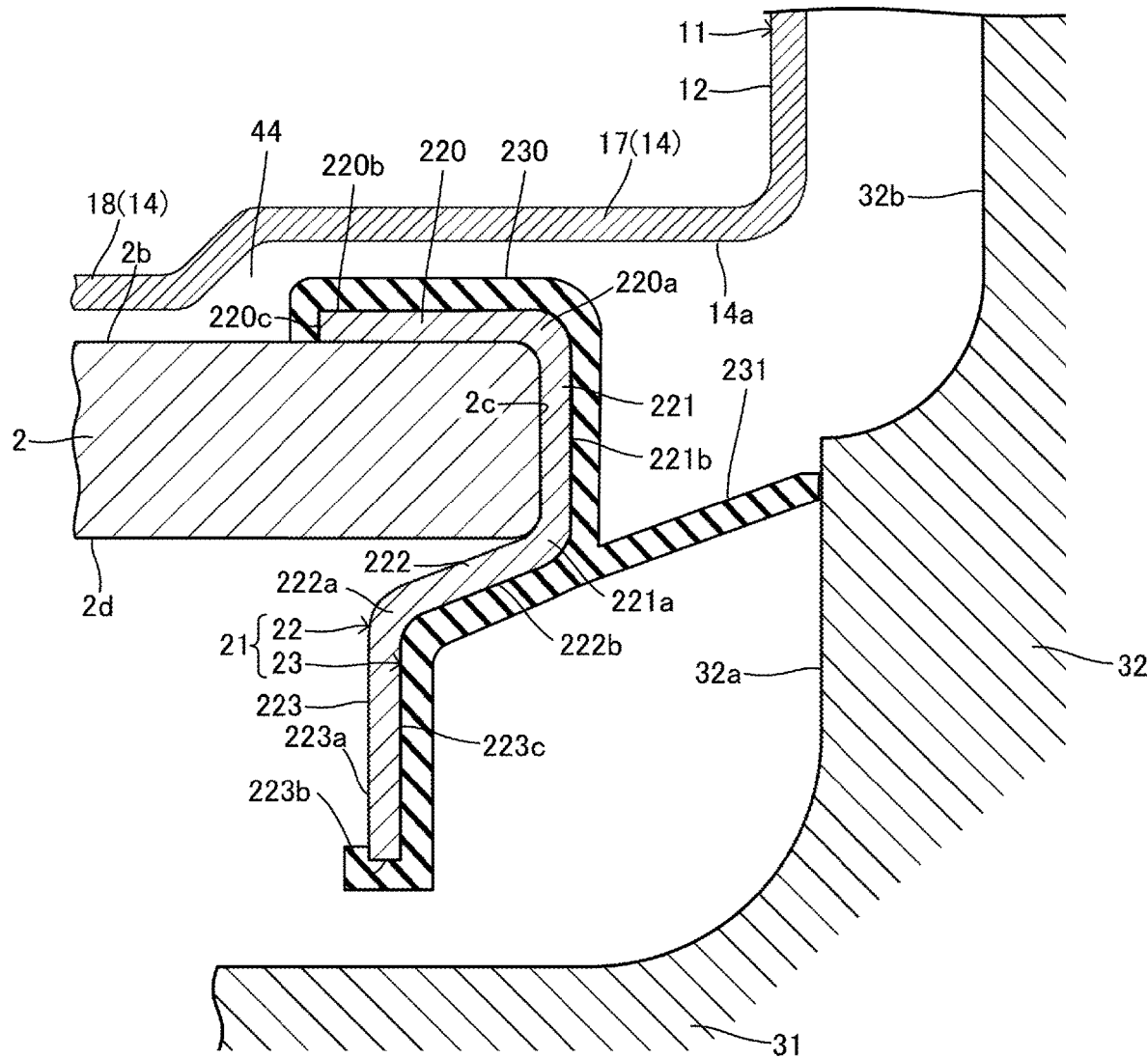
FIG. 3 is an enlarged longitudinal cross-sectional view schematically illustrating the sealing device of one embodiment of the present invention.

FIG. 3 is an enlarged longitudinal cross-sectional view schematically illustrating the seal member 21 which is provided for the sealing device 10 of one embodiment of the present invention. As illustrated in FIG. 3, the seal member 21 includes a support member 22 and a seal portion 23. The seal member 21 is attached to the outer ring 2.

The support member 22 includes a seal cylindrical portion 220, an outer diametrical side circular plate portion 221, a projection portion 222, and an inner diametrical side circular plate portion 223. The seal cylindrical portion 220 is formed to be fitted to the outer circumferential face 2b of the outer ring 2. The outer diametrical side circular plate portion 221 is formed to be along a wheel side end face 2c of the outer ring 2 from a wheel side end portion 220a of the seal cylindrical portion 220. The projection portion 222 is formed so as to be inclined from an inner diametrical side end portion 221a of the outer diametrical side circular plate portion 221 into the vehicle body side. The inner diametrical side circular plate portion 223 is formed so as to extend from an inner diametrical side end portion 222a of the projection portion 222 into the inner diametrical side. Further, the support member 22 is formed by pressing stainless-steel plates such as SPCC or SUS.

The seal portion 23 is made of the elastic member such as rubber and is formed to be integrally fixed to the support member 22. The seal portion 23 includes a seal base portion 230 and a seal lip 231 which is formed to extend from the seal base portion 230. The seal base portion 230 is formed so as to wrap around an inner diametrical side end portion 223b from an inner diametrical side part of a vehicle body side face 223a of the inner diametrical side circular plate portion 223 of the support member 22 and cover an entire surface of a wheel side face 223c and also so as to cover an entire surface of a wheel side face 222b of the projection portion 222, a wheel side face 221b of the outer diametrical side circular plate portion 221, and an outer diametrical side face 220b of the seal cylindrical portion 220.

The seal lip 231 is a side lip and is formed to extend from the seal base portion 230 into the wheel side. In the embodiment, a tip of the seal lip 231 is formed to slidably contact the surface of the rising portion 32a. Although not especially limited, in the embodiment, the seal lip 231 extends from the seal base portion 230 in the vicinity of the inner diametrical side end portion 221a of the outer diametrical side circular plate portion 221 into the surface of the rising portion 32a. Further, as mentioned above, the surface of the rising portion 32a is made to be the ground surface. Furthermore, the embodiment does not necessarily require that the tip of the seal lip 231 slidably contact the surface of the rising portion 32a; the tip of the seal lip 231 can be spaced apart from the surface of the rising portion 32a.

In the sealing device 10 of the embodiment, as illustrated in FIG. 1 and FIG. 3, the slinger cylindrical portion 14 includes a first cylindrical portion 17 which is opposite to the outer diametrical side face 220b of the seal cylindrical portion 220, and a second cylindrical portion 18 which is opposite to the outer circumferential face 2b of the outer ring 2. As mentioned above, since the seal cylindrical portion 220 is fitted to the outer circumferential face 2b of the outer ring 2, an outer diameter of a part of the outer ring 2 to which the seal cylindrical portion 220 is fitted becomes greater by thicknesses of the seal cylindrical portion 220 and of the seal base portion 230, or by the thickness of the seal base portion 230 at a position in which the support member 22 does not exist, than an outer diameter of a part at which the outer circumferential face 2b is exposed. Therefore, in the sealing device 10 of the embodiment, the second cylindrical portion 18 is structured to have a smaller diameter than that of the first cylindrical portion 17. A connection portion between the first cylindrical portion 17 and the second cylindrical portion 18 constitutes a bent labyrinth which is bent along the outer circumferential face of the outer ring 2 to which the seal member 21 is attached. That is, the first cylindrical portion 17 and the second cylindrical portion 18 form a fourth labyrinth 44 by the bent labyrinth.

In the sealing device 10 as described above, the sealing of the gap between the slinger 11 and the flange 32 by the elastic seal 13 and the sealing of the annular gap between the flange 32 and the outer ring 2 by the slinger cylindrical portion 14 are achieved by just attaching the slinger 11 to the flange 32. Further, since the slinger 11 is fixed to the flange 32 by press-fitting the bolt 34, the movement of the slinger 11 is prevented. Accordingly, a function of the first labyrinth 41 does not deteriorate because of the movement of the slinger 11.

Further, in the sealing device 10, the slinger cylindrical portion 14 is arranged from the annular gap between the flange 32 and the outer ring 2 over the knuckle 7 which is arranged at the outer ring 2 so as to be spaced apart from the flange 32. Accordingly, by just attaching the slinger 11 to the flange 32, the second labyrinth 42 as well as the first labyrinth 41 as described above is constituted by the gap between the circular plate portion 15 and the knuckle 7, and the gap between the circular plate portion 15 and the bolt 9. Therefore, intrusion of foreign substances or the like into the vicinity of the annular gap between the flange 32 and the outer ring 2 is more securely prevented by an effect of the second labyrinth 42 in addition to an effect of the first labyrinth 41.

Furthermore, since the sealing device 10 includes the extension portion 16 which is provided at the outer diametrical side end portion of the circular plate portion 15, by just attaching the slinger 11 to the flange 32, the third labyrinth 43 is constituted by the gap between the extension portion 16 and the knuckle 7 as well as the first labyrinth 41 and the second labyrinth 42 as described above. Therefore, intrusion of foreign substances or the like into the vicinity of the annular gap between the flange 32 and the outer ring 2 is more securely prevented by an effect of the third labyrinth 43 in addition to the effects of the first labyrinth 41 and the second labyrinth 42.

Furthermore, in the sealing device 10, since the seal lip 231 is arranged at the annular gap between the flange 32 and the outer ring 2, intrusion of foreign substances or the like into the annular gap is more securely prevented. Besides, since intrusion of foreign substances or the like into the vicinity of the annular gap is prevented by the first labyrinth 41, the second labyrinth 42, and the third labyrinth 43, an effect of preventing instruction of foreign substances or the like is sufficiently obtained even if the number of the seal lips 231 is reduced as illustrated in FIG. 3 or the seal lip 231 is arranged so as not to contact the flange 32. That is, the seal lip 231 is arranged without increasing torque which is necessary for rotation of the inner ring 5 or the outer ring 2.

In addition, in the sealing device 10, intrusion of foreign substances or the like into the vicinity of the annular gap between the flange 32 and the outer ring 2 is further securely prevented by the fourth labyrinth 44 which is bent and is constituted by the first cylindrical portion 17 and the second cylindrical portion 18 of the slinger 11.

Figure 4:
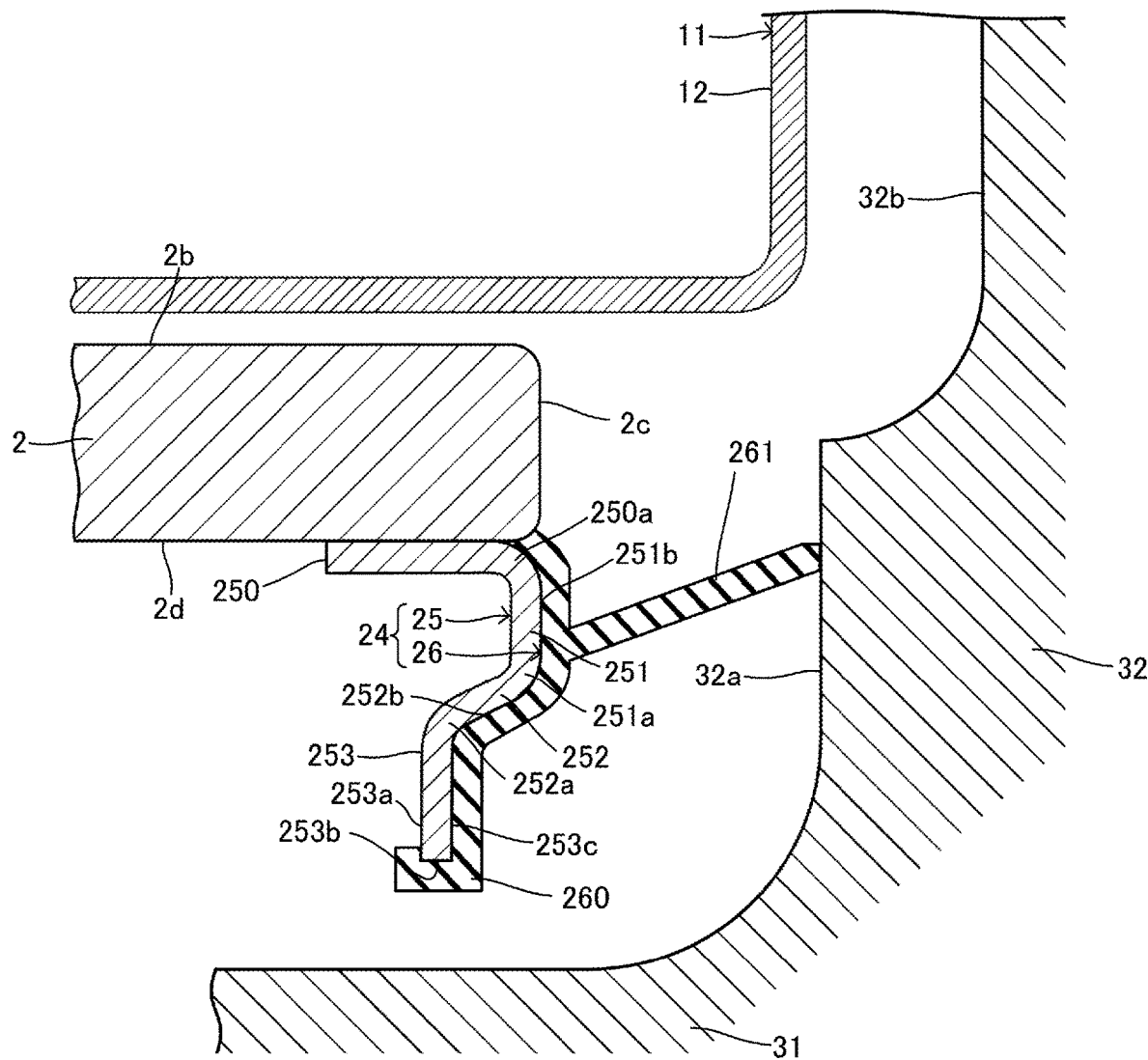
FIG. 4 is an enlarged longitudinal cross-sectional view schematically illustrating another example of the sealing device of one embodiment of the present invention.
Figure 5:
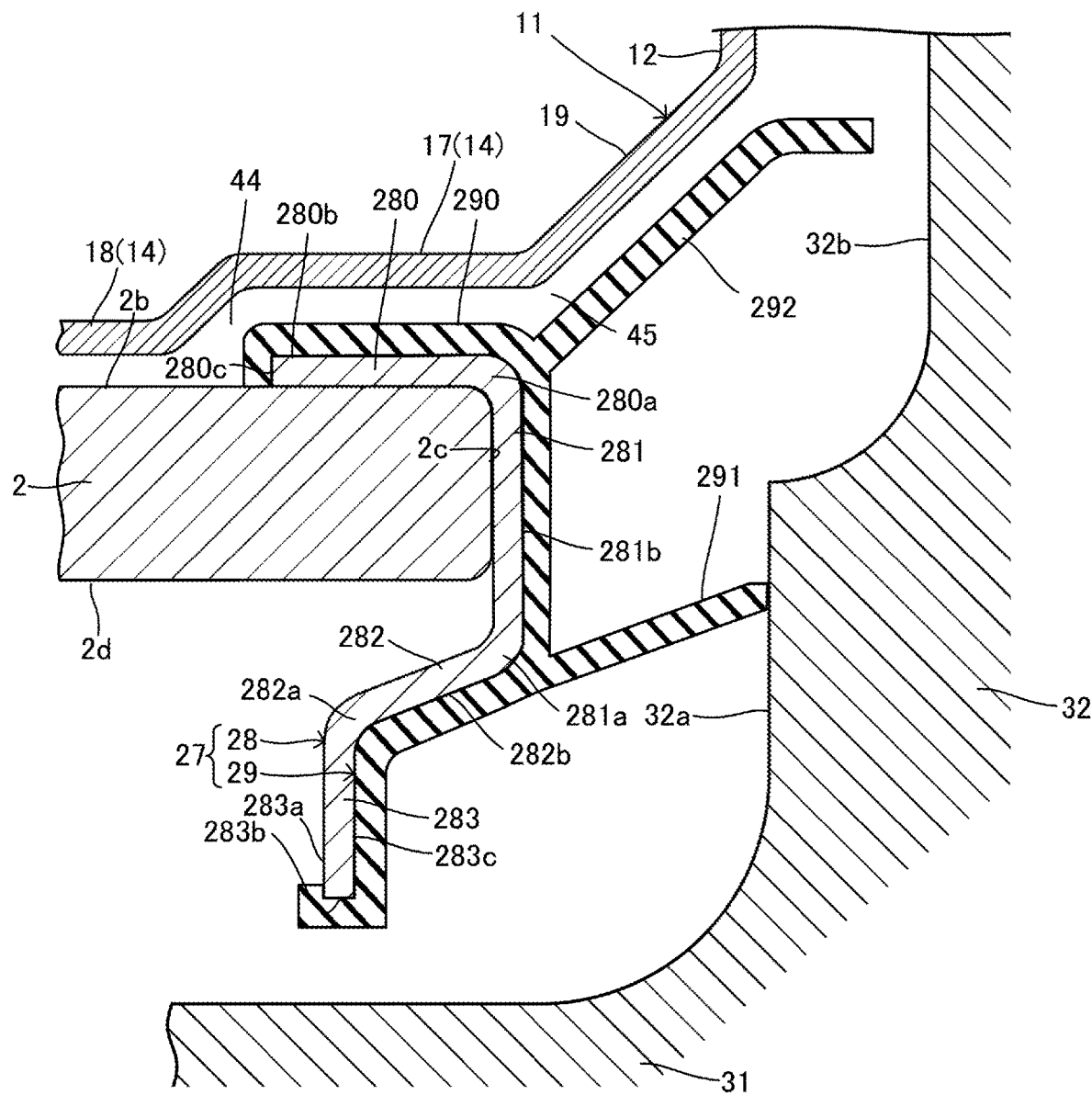
FIG. 5 is an enlarged longitudinal sectional view schematically illustrating another example of the sealing device of one embodiment of the present invention.

In the above-mentioned embodiment, an example in which the seal member 21 is fitted to the outer circumferential face 2b of the outer ring 2 is explained but other structures are also adoptable. FIG. 4 and FIG. 5 are enlarged longitudinal cross-sectional views which schematically illustrate an example of the sealing device in which other structures are adopted as the seal member. As illustrated in FIG. 4, another seal member 24 includes a support member 25 and a seal portion 26. Different from the seal member 21 as described above, the seal member 24 is attached to the outer ring 2 by being fitted to an inner circumferential face 2d of the outer ring 2. In FIG. 4, such elements which exhibit the same function as the sealing device 10 are allotted with the same reference signs and a detailed explanation is omitted.

The support member 25 includes a seal cylindrical portion 250, an outer diametrical side circular plate portion 251, a projection portion 252, and an inner diametrical side circular plate portion 253. The seal cylindrical portion 250 is formed to be fitted to the inner circumferential face 2d of the outer ring 2. The outer diametrical side circular plate portion 251 is formed to extend from a wheel side end portion 250a of the seal cylindrical portion 250 into the inner diametrical side. The projection portion 252 is formed to be inclined from an inner diametrical side end portion 251a of the outer diametrical side circular plate portion 251 into the vehicle body side. The inner diametrical side circular plate portion 253 is formed to extend from an inner diametrical side end portion 252a of the projection portion 252 into the inner diametrical side. Further, material of the support member 25 is the same as that of the support member 22.

The seal portion 26 is made of an elastic member such as rubber and is formed to be integrally fixed to the support member 25. The seal portion 26 includes a seal base portion 260 and a seal lip 261 which is formed to extend from the seal base portion 260. The seal base portion 260 is formed to cover an entire surface of a wheel side face 253c so as to wrap around an inner diametrical side end portion 253b from a part on an inner diametrical side of a vehicle body side face 253a of the inner diametrical side circular plate portion 253 of the support member 25 and also to cover a wheel side face 252b of the projection portion 252 and a wheel side face 251b of the outer diametrical side circular plate portion 251.

The seal lip 261 is a side lip and is formed to extend from the seal base portion 260 into the wheel side. In the embodiment, a tip of the seal lip 261 is formed to slidably contact the surface of the rising portion 32a. Although not especially limited, in the embodiment, the seal lip 261 extends from the seal base portion 260 in the vicinity of the inner diametrical side end portion 251a of the outer diametrical side circular plate portion 251 into the surface of the rising portion 32a. Further, as described above, the surface of the rising portion 32a is made to be the ground surface. Besides, the embodiment does not necessarily require that the tip of the seal lip 261 slidably contact the surface of the rising portion 32a; the tip of the seal lip 261 can be spaced apart from the surface of the rising portion 32a.

Further, since the seal member 24 is constituted so as not to be fitted to the outer circumferential face 2b of the outer ring 2, a constructional element of the seal member 24 does not exist on the outer circumferential face 2b of the outer ring 2 which is opposite to the slinger 11. Therefore, different from the above-described embodiment, the slinger cylindrical portion 14 of the slinger 11 is constituted so as not to include the first cylindrical portion 17 and the second cylindrical portion 18.

Even in the sealing device 10 in which the seal member 24 is used in place of the above-described seal member 21, since the seal lip 261 is arranged at the annular gap between the flange 32 and the outer ring 2, intrusion of foreign substances or the like into the annular gap is further securely prevented. Further, since intrusion of foreign substances or the like into the vicinity of the annular gap is prevented by the first labyrinth 41, the second labyrinth 42, and the third labyrinth 43, the effect of preventing intrusion of foreign substances or the like is sufficiently obtained even when the number of the seal lips 261 is reduced as illustrated in FIG. 4 or the seal lip 261 is arranged so as not to contact the flange 32. That is, the seal lip 261 is arranged without increasing torque which is necessary for rotation of the inner ring 5 or the outer ring 2.

As illustrated in FIG. 5, another seal member 27 includes a support member 28 and a seal portion 29. The seal member 27 is attached to the outer ring 2 by being fitted to the outer circumferential face 2b of the outer ring 2 in the same manner as the above-described seal member 21. Moreover, in FIG. 5, such elements which exhibit a function the same as the sealing device 10 as described above are allotted with the same reference signs and a detailed explanation is omitted.

The support member 28 includes a seal cylindrical portion 280, an outer diametrical side circular plate portion 281, a projection portion 282, and an inner diametrical side circular plate portion 283 in the same manner as the support member 22. The seal cylindrical portion 280 is formed to be fitted to the outer circumferential face 2b of the outer ring 2. The outer diametrical side circular plate portion 281 is formed to be along the wheel side end face 2c of the outer ring 2 from a wheel side end portion 280a of the seal cylindrical portion 280. The projection portion 282 is formed to be inclined from an inner diametrical side end portion 281a of the outer diametrical side circular plate portion 281 into a side of the bearing space S. The inner diametrical side circular plate portion 283 is formed to extend from an inner diametrical side end portion 282a of the projection portion 282 into the inner diametrical side. Moreover, material of the support member 28 is the same as that of the support member 22.

The seal portion 29 is made of an elastic member such as rubber and is formed to be integrally fixed to the support member 28. The seal portion 29 includes a seal base portion 290 and seal lips 291, 292 which are formed to extend from the seal base portion 290. The seal base portion 290 is formed to cover an entire surface of a wheel side face 283c by wrapping around an inner diametrical side end portion 283b from a part on an inner diametrical side of a vehicle body side face 283a of the inner diametrical side circular plate portion 283 of the support member 28 and also to cover an entire surface of a wheel side face 282b of the projection portion 282, a wheel side face 281b of the outer diametrical side circular plate portion 281, and an outer diametrical side face 280b and a vehicle body side face 280c of the seal cylindrical portion 280.

Two seal lips 291, 292 are side lips and are formed to extend from the seal base portion 290 into the wheel side. Although not especially limited, in the embodiment, the seal lip 291 extends from the seal base portion 290 in the vicinity of the inner diametrical side end portion 281a of the outer diametrical side circular plate portion 281 into the surface of the rising portion 32a. Further, the seal lip 292 extends from the seal base portion 290 in the vicinity of the wheel side end portion 280a of the seal cylindrical portion 280 into the surface of the step portion 32b. In the embodiment, a tip of the seal lip 291 is formed to slidably contact the surface of the rising portion 32a. Besides, a tip of the seal lip 292 is formed to be spaced apart from the surface of the step portion 32b. Since the seal lip 292 is extended into the wheel side and into the outer diametrical side, an inclined portion 19 is provided in such a manner that the shape of the slinger 11 matches the shape of the seal lip 292. Further, a connection portion between the first cylindrical portion 17 and the inclined portion 19 constitutes a bent labyrinth which is bent along an outer circumferential face between the seal base portion 290 and the seal lip 292. That is, the first cylindrical portion 17 and the inclined portion 19 form a fifth labyrinth 45 by the bent labyrinth. Further, the surface of the rising portion 32a is made to be the ground surface as described above. Furthermore, the embodiment does not necessarily require that the tip of the seal lip 291 slidably contact the surface of the rising portion 32a; the tip of the seal lip 291 can be spaced apart from the surface of the rising portion 32a.

Even in the sealing device 10 which uses the seal member 27 in place of the above-described seal member 21, since the seal lips 291, 292 are arranged at the annular gap between the flange 32 and the outer ring 2, intrusion of foreign substances or the like into the annular gap is further securely prevented. Further, since intrusion of foreign substances or the like into the vicinity of the annular gap is prevented by the first to fifth labyrinths 41 to 45, the effect of preventing intrusion of foreign substances or the like is sufficiently obtained even when the seal lip 291 is arranged without contacting the flange 32. That is, the seal lip 291 is arranged without increasing torque which is necessary for rotation of the inner ring 5 or the outer ring 2.

In the above-mentioned description, a concrete structure of the seal member which is adoptable to the sealing device 10 of the present invention is exemplified but the structure of the seal member is not limited to the above; various changes in the shape are applicable. For instance, in the seal member 21 as illustrated in FIG. 3, an example in which the seal cylindrical portion 220 of the support member 22 and the seal base portion 230 of the seal portion 23 are constituted to overlap with each other as the seal member which is opposite to the slinger 11 is explained but a part which is fitted to the outer ring 2 can be constituted by the seal cylindrical portion 220 only or by the seal base portion 230 only.

Further, in the above-described embodiment, such a structure in which the sealing device 10 includes the seal member is explained as a specifically preferable embodiment; however, the seal member is not necessary to be included and such a sealing device which is constituted only by the slinger is also adoptable.

Figure 6:
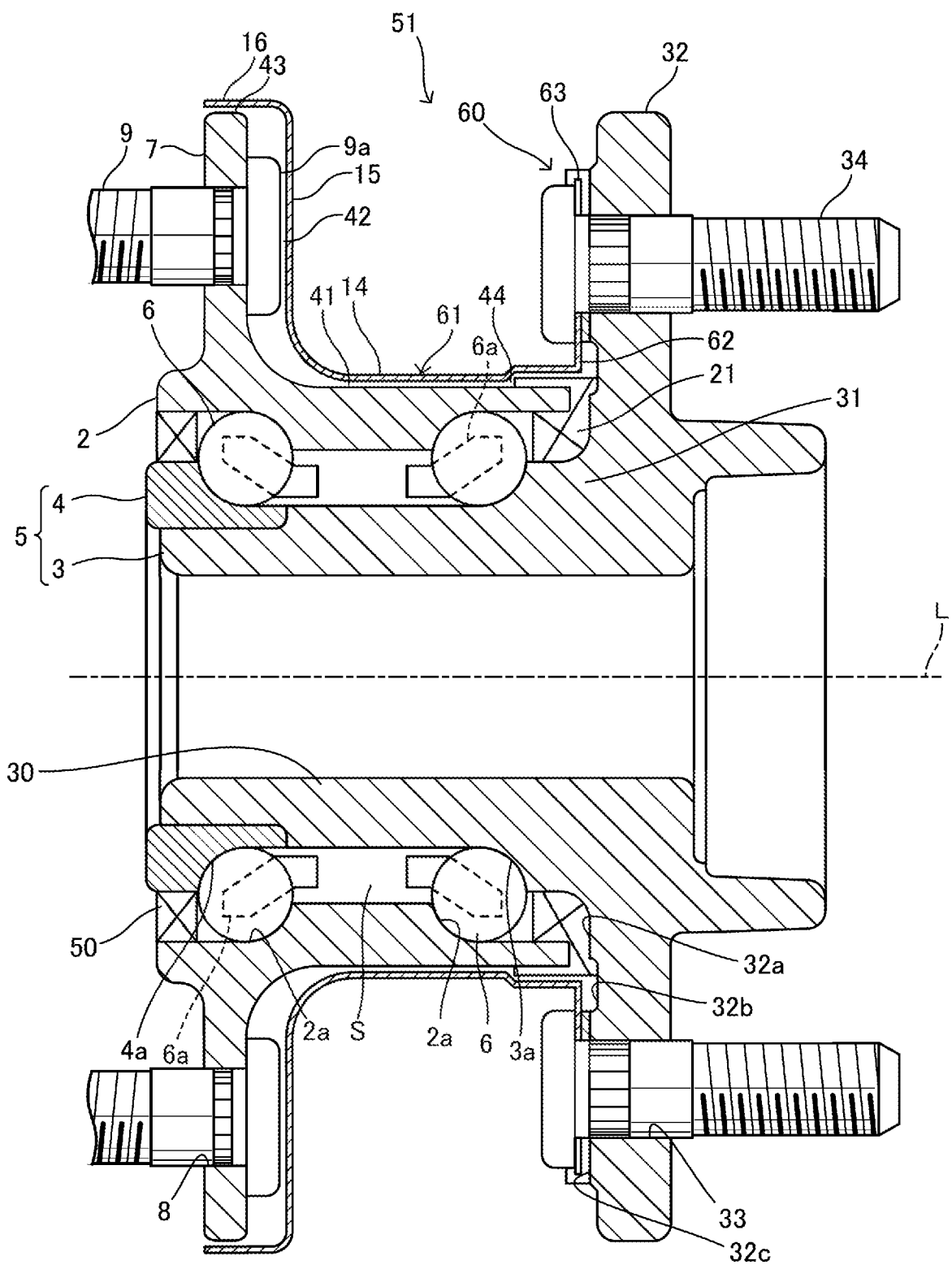
FIG. 6 is a longitudinal cross-sectional view schematically illustrating another example of the bearing device to which the sealing device of one embodiment of the present invention is applied.
Figure 7:
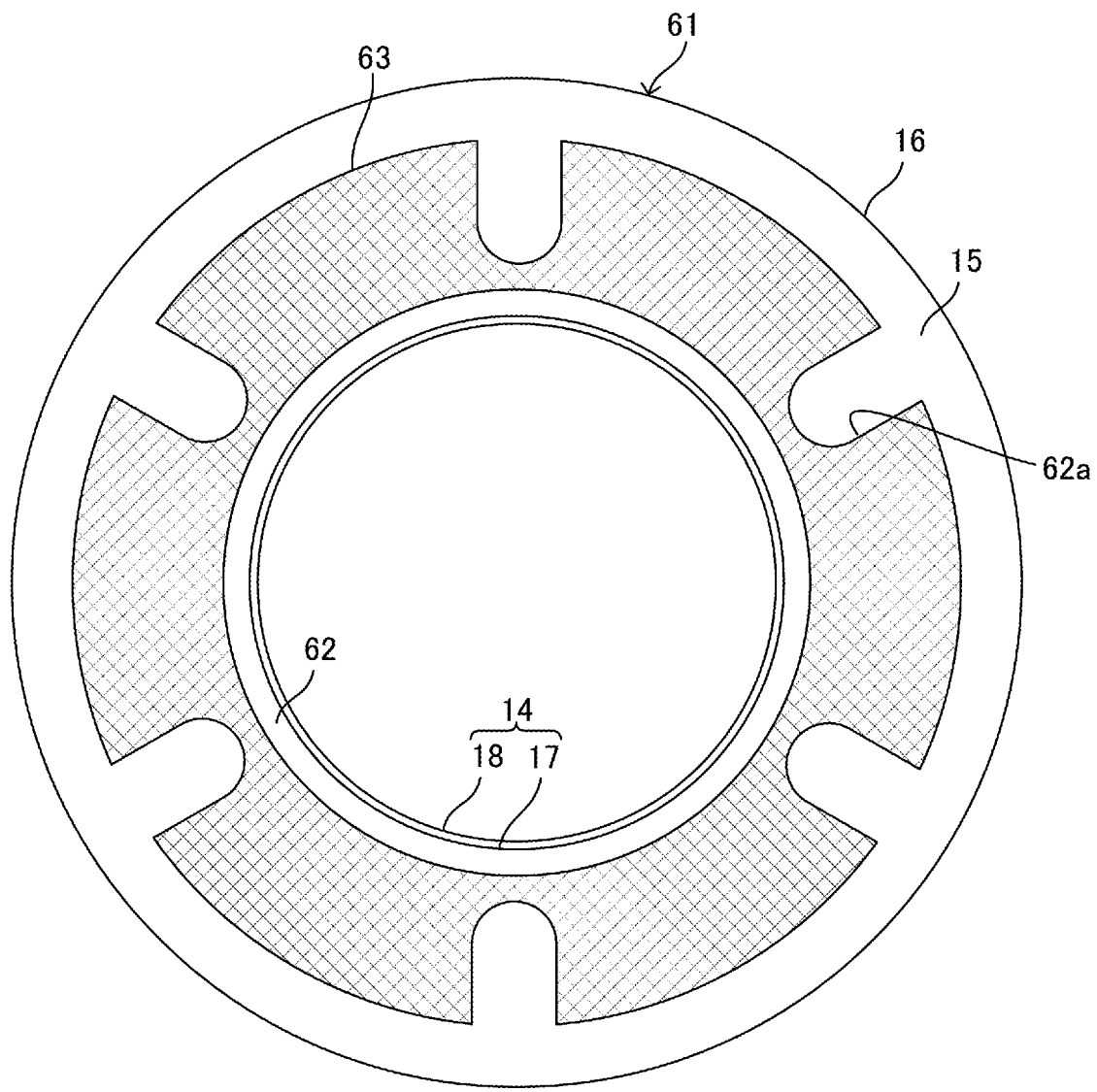
FIG. 7 is a side view schematically illustrating a state in which the main body portion and the slinger cylindrical portion of the sealing device illustrated in FIG. 6 are seen from the flange side.

Meanwhile, when mounting the sealing device 10 illustrated in FIG. 1 on the bearing device 1, the bolt 34 needs to be arranged in an insertable state into the bolt hole 33 and the insertion holes 12a parallel to the shalt L between the main body portion 12 and the circular plate portion 15 which are opposite to each other in the sealing device 10. Therefore, herein, a structure in which the space between the main body portion 12 and the circular plate portion 15 is made further smaller than that of FIG. 1 is to be explained. FIG. 6 is a longitudinal cross-sectional view schematically illustrating another example of the bearing device to which the sealing device of one embodiment of the present invention is applied. Further, FIG. 7 is a side view schematically illustrating a state in which the main body portion and the slinger cylindrical portion of the sealing device illustrated in FIG. 6 are seen from the flange side. In FIG. 6 and FIG. 7, such elements which exhibit an effect the same as the sealing device 10 are allotted with the same reference signs and a detailed explanation is omitted.

As illustrated in FIG. 6 and FIG. 7, a sealing device 60 which is applied to a bearing device 51 of the embodiment is different from the sealing device 10 illustrated in FIG. 1 and FIG. 2 only in the structure of a main body portion 62 of a slinger 61. As illustrated in FIG. 6 and FIG. 7, the main body portion 62 penetrates through the thickness direction of the main body portion 62 and has a plurality of insertion grooves 62a, i.e., insertion portions, into which the bolt 34 is inserted. The insertion grooves 62a are through holes in cutout shapes from the circumference of the main body portion 62 into the central direction. Moreover, material of the slinger 61 is the same as that of the slinger 11.

In the mounting process, the main body portion 62 is attached to the face on the vehicle body side of the flange 32 of the inner ring 5. The insertion grooves 62a of the main body portion 62 are provided so as to respectively correspond to the plurality of bolt holes 33 of the flange 32. Although not especially limited, the outer diameter of the main body portion 62 in a circulate plate shape is smaller than the outer diameter of the flange 32, and the head portion of the bolt 34 which is press-fitted into the bolt hole 33 is set in the state so as to entirely overlap with the main body portion 62.

An elastic seal 63 is made of an elastic member and is integrally formed around the insertion grooves 62a of the main body portion 62 which is a side opposite to the flange 32. As illustrated in FIG. 7, the elastic seal 63 is annularly provided over the whole circumference of the main body portion 62 in a range of a specific width in the diametrical direction from an outer diametrical side end portion of the main body portion 62; all the insertion grooves 62a are included within a range of the elastic seal 63. In the embodiment, the elastic seal 63 is composed of rubber and is integrally formed with the slinger 61 by vulcanized adhesion. When the main body portion 62 is attached to the flange 32, the elastic seal 63 becomes pressure-welded to the surface of the annular projection portion 32c of the flange 32. Thereby, a gap between the slinger 61 and the flange 32 is sealed.

By such a structure, in inserting the bolt 34 into the bolt hole 33, the tip of the bolt 34 is in an inclined state toward the inner diametrical side and is moved from the outer diametrical side into the inner diametrical side in the diametrical direction of the flange 32; when the tip of the bolt 34 reaches the bolt hole 33, the tip of the bolt 34 is inserted into the bolt hole while moving a head portion side of the bolt 34 toward the inner diametrical side in such a manner that the bolt 34 becomes parallel to the shaft L. In the slinger 61, in a mounting process thereof, the tip of the bolt 34 is moved along the insertion groove 62a when moving into the diametrical direction; thereby, the bolt 34 is inserted into the bolt hole 33 in such a manner that the main body portion 62, the elastic seal 63, and the bolt 34 do not contact with each other. Accordingly, even when a space between the main body portion 62 and the circular plate portion 15 is smaller as compared to the sealing device 10, the bolt 34 is inserted into the bolt hole 33. Further, the function and effect of the sealing device 60 are the same as that of the sealing device 10.

As described above, according to an embodiment of the present invention, the sealing device which is assembled with comparative ease and more securely prevents intrusion of foreign substances or the like into the object to be sealed is achieved.

Moreover, the above-described embodiment does not limit a range of technical scope, and various changes in shape or application are adoptable within a range of the present invention. For instance, in the above-described embodiment, such a structure in which the slingers 11, 61 include the extension portion 16 is explained as the particularly preferred embodiment; however, even if the extension portion 16 does not exist, the effect of preventing intrusion of foreign substances or the like into the vicinity of the annular gap by the first labyrinth 41 and the second labyrinth 42 is obtained. Furthermore, such structure in which the circular plate portion 15 does not exist is also adoptable similarly. Even if the circular plate portion 15 does not exist, the effect of preventing intrusion of foreign substances or the like into the vicinity of the annular gap by the first labyrinth 41 is obtained. In the sealing device having the structures as above, the above-described seal member is not required and can be adopted selectively. Physical form of the above-described element including the slinger or the seal member can be changed optionally within a range of exhibiting the effect of the present invention.

DESCRIPTION OF THE REFERENCE NUMERAL 1, 51 bearing device
2 outer ring (outer member)
5 inner ring (inner member)
7 knuckle
10, 60 sealing device
11, 61 slinger
12, 62 main body portion
12a insertion hole (insertion portion)
62a insertion groove (insertion portion)
13, 63 elastic seal
14 slinger cylindrical portion
15 circular plate portion
16 extension portion
22, 25, 28 support member
231, 261, 291 seal lip
32 flange
33 bolt hole
34 bolt
41 first labyrinth
42 second labyrinth
43 third labyrinth

What is claimed is:

1. A sealing device to be provided in a bearing device having an inner member and an outer member that rotate relatively and coaxially, the sealing device sealing an annular gap between the outer member and a flange provided at the inner member in a cylindrical shape and extending in outer diametrical direction,
    the sealing device comprising:
    a slinger to be attached to the flange by bolts that are press-fitted into a plurality of bolt holes provided at the flange; and
    a seal member to be attached to the outer member,
    the slinger comprising:
    a main body portion in a hollow disk shape having insertion portions into which the bolts are inserted;
    an elastic seal being made of an elastic member and being integrally formed around the insertion portions of the main body portion; and
    a slinger cylindrical portion extending from an inner diametrical side end portion of the main body portion in an axial direction and forming a first labyrinth by a gap between the slinger cylindrical portion and an outer circumferential face of the outer member,
    wherein the seal member comprises a support member being fitted to the outer member, and a seal lip made of an elastic member, the seal lip being fixed to the support member and being elastically contacted to the flange or being arranged adjacent to the flange,
    wherein the seal member is configured to be fitted to the outer circumferential face of the outer member,
    wherein the slinger cylindrical portion comprises:
    a first cylindrical portion that faces an outer circumferential face of the seal member that is fitted to the outer circumferential face of the outer member, and
    a second cylindrical portion that faces the outer circumferential face of the outer member and has a diameter that is smaller than that of the first cylindrical portion, and
    wherein the first cylindrical portion and the second cylindrical portion form a labyrinth that is bent along the outer circumferential face of the outer member to which the seal member is attached.

2. A sealing device to be provided in a bearing device having an inner member and an outer member that rotate relatively and coaxially, the sealing device sealing an annular gap between the outer member and a flange provided at the inner member in a cylindrical shape and extending in outer diametrical direction,
    the sealing device comprising:
    a slinger to be attached to the flange by bolts that are press-fitted into a plurality of bolt holes provided at the flange; and
    a seal member to be attached to the outer member,
    the slinger comprising:
    a main body portion in a hollow disk shape having insertion portions into which the bolts are inserted;
    an elastic seal being made of an elastic member and being integrally formed around the insertion portions of the main body portion; and
    a slinger cylindrical portion extending from an inner diametrical side end portion of the main body portion in an axial direction and forming a first labyrinth by a gap between the slinger cylindrical portion and an outer circumferential face of the outer member,
    wherein the slinger is arranged to be adjacently opposed to a knuckle that is integrally provided on an outer circumferential side of the outer member so as to be spaced apart from the flange and further comprises a circular plate portion that forms a second labyrinth by a gap between the circular plate portion and the knuckle, wherein the seal member comprises a support member being fitted to the outer member, and a seal lip made of an elastic member, the seal lip being fixed to the support member and being elastically contacted to the flange or being arranged adjacent to the flange, wherein the seal member is configured to be fitted to the outer circumferential face of the outer member, wherein the slinger cylindrical portion comprises:

a first cylindrical portion that faces an outer circumferential face of the seal member that is fitted to the outer circumferential face of the outer member, and a second cylindrical portion that faces the outer circumferential face of the outer member and has a diameter that is smaller than that of the first cylindrical portion, and wherein the first cylindrical portion and the second cylindrical portion form a labyrinth that is bent along the outer circumferential face of the outer member to which the seal member is attached.

3. A sealing device to be provided in a bearing device having an inner member and an outer member that rotate relatively and coaxially, the sealing device sealing an annular gap between the outer member and a flange provided at the inner member in a cylindrical shape and extending in outer diametrical direction, the sealing device comprising:

a slinger to be attached to the flange by bolts that are press-fitted into a plurality of bolt holes provided at the flange; and a seal member to be attached to the outer member, the slinger comprising:

a main body portion in a hollow disk shape having insertion portions into which the bolts are inserted;

an elastic seal being made of an elastic member and being integrally formed around the insertion portions of the main body portion;

a slinger cylindrical portion extending from an inner diametrical side end portion of the main body portion in an axial direction and forming a first labyrinth by a gap between the slinger cylindrical portion and an outer circumferential face of the outer member; and an extension portion that forms a third labyrinth by a gap between the extension portion and an outer circumferential face of a knuckle, wherein the slinger is arranged to be adjacently opposed to the knuckle that is integrally provided on an outer circumferential side of the outer member so as to be spaced apart from the flange and further comprises a circular plate portion that forms a second labyrinth by a gap between the circular plate portion and the knuckle, wherein the seal member comprises a support member being fitted to the outer member, and a seal lip made of an elastic member, the seal lip being fixed to the support member and being elastically contacted to the flange or being arranged adjacent to the flange, wherein the seal member is configured to be fitted to the outer circumferential face of the outer member, wherein the slinger cylindrical portion comprises:

a first cylindrical portion that faces an outer circumferential face of the seal member that is fitted to the outer circumferential face of the outer member, and a second cylindrical portion that faces the outer circumferential face of the outer member and has a diameter that is smaller than that of the first cylindrical portion, and wherein the first cylindrical portion and the second cylindrical portion form a labyrinth that is bent along the outer circumferential face of the outer member to which the seal member is attached.

* * * * *